United States Patent
Kobayashi (10) Patent No.: US 12,250,087 B2
(45) Date of Patent: Mar. 11, 2025

(54) POWER-OVER-FIBER SYSTEM

(71) Applicant: KYOCERA CORPORATION, Kyoto (JP)

(72) Inventor: Takahiro Kobayashi, Sagamihara (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/768,470

(22) PCT Filed: Jun. 22, 2020

(86) PCT No.: PCT/JP2020/024363
§ 371 (c)(1),
(2) Date: Apr. 13, 2022

(87) PCT Pub. No.: WO2021/075088
PCT Pub. Date: Apr. 22, 2021

(65) Prior Publication Data
US 2024/0297802 A1    Sep. 5, 2024

(30) Foreign Application Priority Data
Oct. 18, 2019    (JP) .................................. 2019-190634

(51) Int. Cl.
*H04B 10/80* (2013.01)
*H04B 10/25* (2013.01)
*H04L 12/10* (2006.01)

(52) U.S. Cl.
CPC ............ *H04L 12/10* (2013.01); *H04B 10/25* (2013.01); *H04B 10/807* (2013.01)

(58) Field of Classification Search
None
See application file for complete search history.

(56) References Cited

U.S. PATENT DOCUMENTS 9,055,483 B2 *  6/2015  Pantelias ............... H04W 28/20
9,490,912 B2 * 11/2016  Hyde ................... H04B 10/807
(Continued)

FOREIGN PATENT DOCUMENTS

GB    2593338 A  *  9/2021  ............... G02B 6/00
JP    2010135989 A    6/2010
(Continued)

OTHER PUBLICATIONS

Gustavsson, Sara, Blue LEDs—Filling the world with new light, The Nobel Prize in Physics 2014 (Year: 2014).*
(Continued)

*Primary Examiner* — Jai M Lee
(74) *Attorney, Agent, or Firm* — HAUPTMAN HAM, LLP (57) ABSTRACT

A power-over-fiber system includes a power sourcing equipment including a semiconductor laser that oscillates with electric power to output feed light, a plurality of powered devices each including a photoelectric conversion element that converts the feed light from the power sourcing equipment into electric power, an optical fiber cable that transmits the feed light from the power sourcing equipment to the plurality of powered devices, and a switch element that distributes the feed light in accordance with a proportion of electric powers needed by the plurality of powered devices. In the power-over-fiber system, the switch element sequentially switches an optical path of the feed light to be distributed to the respective powered devices, with a time distribution corresponding to the proportion of the electric powers needed by the plurality of powered devices to distribute the feed light.

7 Claims, 7 Drawing Sheets

(56) References Cited

U.S. PATENT DOCUMENTS

| | | | | |
|---|---|---|---|---|
| 10,498,566 B2* | 12/2019 | Kennedy | ............... | H04L 25/26 |
| 10,580,921 B2* | 3/2020 | Nugent, Jr. | ......... | H04B 10/807 |
| 10,845,394 B2* | 11/2020 | Barczyk | ................ | H03F 3/08 |
| 10,924,186 B1* | 2/2021 | Lynn | ................. | G02B 6/4206 |
| 11,177,574 B2* | 11/2021 | Miller, II | ............. | H01Q 9/145 |
| 11,581,953 B2* | 2/2023 | Nugent, Jr. | ............ | H02J 50/30 |
| 2011/0255860 A1* | 10/2011 | Lee | ................. | G01M 11/3136 |
| | | | | 398/10 |
| 2011/0278479 A1* | 11/2011 | Chan | .................... | H02J 50/80 |
| | | | | 250/551 |
| 2016/0308620 A1* | 10/2016 | Liu | ................. | H04B 10/07955 |

FOREIGN PATENT DOCUMENTS

| | | | |
|---|---|---|---|
| JP | 201119291 A | | 1/2011 |
| JP | 2014222963 A | | 11/2014 |
| JP | 201798643 A | | 6/2017 |
| JP | 2017098643 A | * | 6/2017 |

OTHER PUBLICATIONS

Luo et al., Resource Management for Broadband Access over Time-Division Multiplexed Passive Optical Networks, IEEE, 2007 (Year: 2007).*

OSI Optoelectronics, Application Notes, 2005 (Year: 2005).*

* cited by examiner

POWER-OVER-FIBER SYSTEM

RELATED APPLICATIONS

The present application is a National Phase of International Application No. PCT/JP2020/024363 filed Jun. 22, 2020, which claims priority to Japanese Application No. 2019-190634, filed Oct. 18, 2019.

TECHNICAL FIELD

The present disclosure relates to optical power supply.

BACKGROUND ART

Recently, there has been studied an optical power supply system that converts electric power into light (called feed light), transmits the feed light, converts the feed light into electric energy, and uses the electric energy as electric power.

PTL 1 discloses an optical communication device including an optical transmitter, an optical fiber, and an optical receiver. The optical transmitter transmits signal light modulated based on an electric signal and feed light for supplying electric power. The optical fiber includes a core, a first cladding around the core, and a second cladding around the first cladding. The core transmits the signal light. The first cladding has a refractive index lower than that of the core and transmits the feed light. The second cladding has a refractive index lower than that of the first cladding. The optical receiver operates with electric power obtained by converting the feed light transmitted through the first cladding of the optical fiber and converts the signal light transmitted through the core of the optical fiber into the electric signal.

CITATION LIST

Patent Literature

PTL 1: Japanese Unexamined Patent Application Publication No. 2010-135989

SUMMARY OF INVENTION

Technical Problem

In optical power supply, further improvement in optical power supply efficiency is desired. As one form of the improvement, implementation of efficient power supply corresponding to electric power loads on a powered side is desired.

Solution to Problem

A power-over-fiber system according to one aspect of the present disclosure includes
a power sourcing equipment including a semiconductor laser that oscillates with electric power to output feed light,
a plurality of powered devices each including a photoelectric conversion element that converts the feed light from the power sourcing equipment into electric power,
an optical fiber cable that transmits the feed light from the power sourcing equipment to the plurality of powered devices, and
a switch element that distributes the feed light in accordance with a proportion of electric powers needed by the plurality of powered devices.

In the power-over-fiber system,
the switch element sequentially switches an optical path of the feed light to be distributed to the respective powered devices, with a time distribution corresponding to the proportion.

DESCRIPTION OF EMBODIMENTS

One embodiment of the present disclosure is described below with reference to the drawings.

(1) Overview of System

First Embodiment

Figure 1:
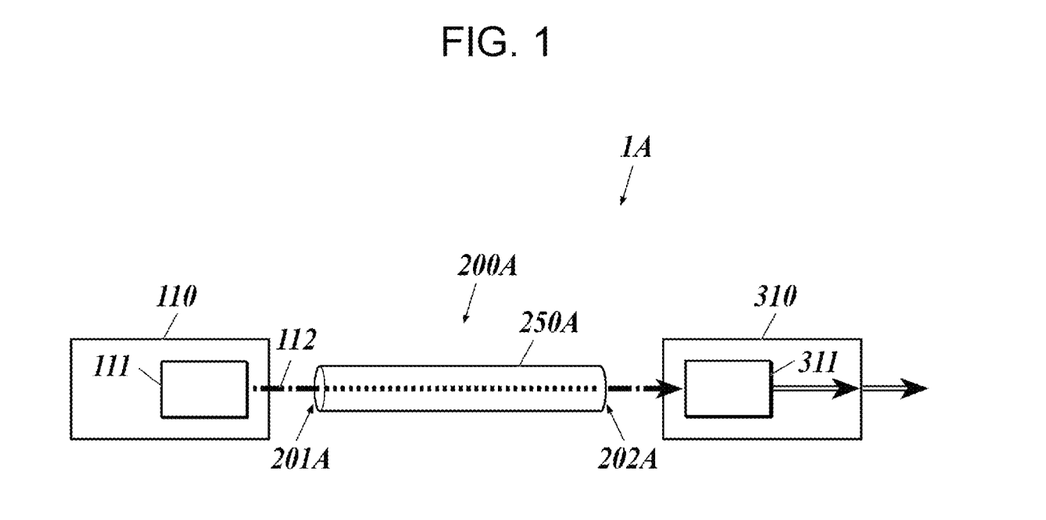
FIG. 1 is a diagram illustrating a configuration of a power-over-fiber system according to a first embodiment of the present disclosure.

As illustrated in FIG. 1, a power-over-fiber (PoF) system 1A according to the present embodiment includes a power sourcing equipment (PSE) 110, an optical fiber cable 200A, and a powered device (PD) 310.

In the present disclosure, the power sourcing equipment is a device that converts electric power into optical energy and supplies the optical energy, and the powered device is a device that receives the supplied optical energy and converts the optical energy into electric power.

The power sourcing equipment 110 includes a semiconductor laser 111 for power supply.

The optical fiber cable 200A includes an optical fiber 250A that forms a channel of feed light.

The powered device 310 includes a photoelectric conversion element 311.

The power sourcing equipment 110 is connected to a power source, which electrically drives the semiconductor laser 111 for power supply and so on.

The semiconductor laser 111 for power supply oscillates with electric power supplied from the power source to output feed light 112.

The optical fiber cable 200A has one end 201A connectable to the power sourcing equipment 110 and another end 202A connectable to the powered device 310, and transmits the feed light 112.

The feed light 112 from the power sourcing equipment 110 is input to the one end 201A of the optical fiber cable 200A. The feed light 112 propagates through the optical fiber 250A and is output from the other end 202A to the powered device 310.

The photoelectric conversion element 311 converts the feed light 112 transmitted through the optical fiber cable 200A into electric power. The electric power obtained by the photoelectric conversion element 311 through the conversion is used as driving electric power needed in the powered device 310. The powered device 310 is capable of outputting, for an external device, the electric power obtained by the photoelectric conversion element 311 through the conversion.

Semiconductor materials of semiconductor regions that exhibit a light-electricity conversion effect of the semiconductor laser 111 for power supply and the photoelectric conversion element 311 are semiconductors having a short laser wavelength of 500 nm or shorter.

Semiconductors having a short laser wavelength have a large band gap and a high photoelectric conversion efficiency. Thus, the photoelectric conversion efficiency on the power-generating side and the powered-side of optical power supply improves, and the optical power supply efficiency improves.

Therefore, as such semiconductor materials, for example, semiconductor materials that are laser media having a laser wavelength (fundamental wave) of 200 to 500 nm such as diamond, gallium oxide, aluminum nitride, and gallium nitride may be used.

As the semiconductor materials, semiconductors having a band gap of 2.4 eV or greater are used.

For example, semiconductor materials that are laser media having a band gap of 2.4 to 6.2 eV such as diamond, gallium oxide, aluminum nitride, and gallium nitride may be used.

Laser light having a longer wavelength tends to have a higher transmission efficiency. Laser light having a shorter wavelength tends to have a higher photoelectric conversion efficiency. Thus, in the case of long-distance transmission, a semiconductor material that is a laser medium having a laser wavelength (fundamental wave) longer than 500 nm may be used. When the photoelectric conversion efficiency is prioritized, a semiconductor material that is a laser medium having a laser wavelength (fundamental wave) shorter than 200 nm may be used.

These semiconductor materials may be used in either the semiconductor laser 111 for power supply or the photoelectric conversion element 311. The photoelectric conversion efficiency is improved on the power-sourcing side or the powered side, and consequently the optical power supply efficiency improves.

Second Embodiment

Figure 2:
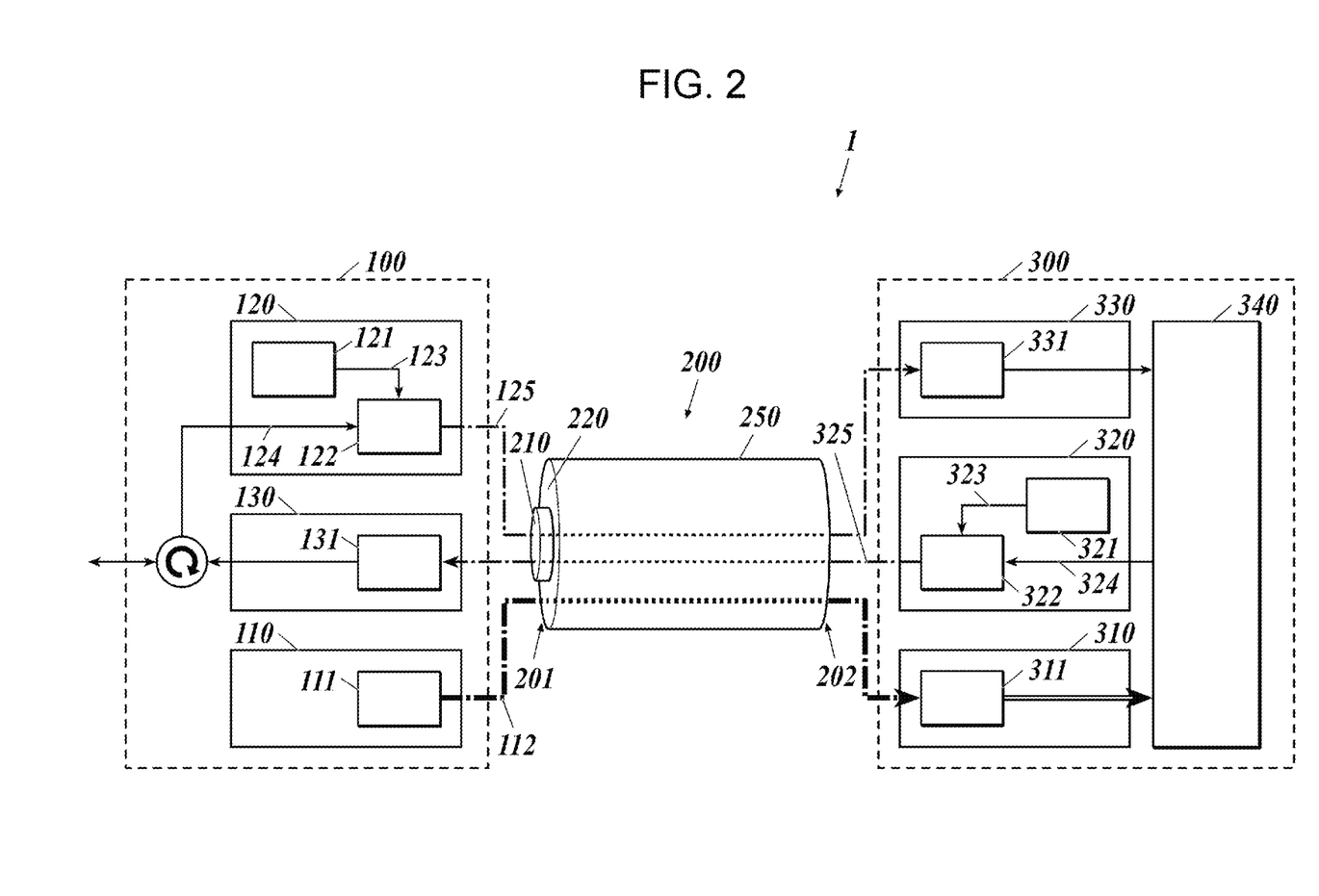
FIG. 2 is a diagram illustrating a configuration of a power-over-fiber system according to a second embodiment of the present disclosure.

As illustrated in FIG. 2, a power-over-fiber (PoF) system 1 according to the present embodiment is a system including a power supply system and an optical communication system with an optical fiber. Specifically, the power-over-fiber system 1 includes a first data communication device 100 including a power sourcing equipment (PSE) 110, an optical fiber cable 200, and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 that perform data communication. The first data communication device 100 corresponds to a data terminal equipment (DTE), a repeater, or the like. The transmitter 120 includes a semiconductor laser 121 for signals and a modulator 122. The receiver 130 includes a photodiode 131 for signals.

The optical fiber cable 200 includes an optical fiber 250 including a core 210 and a cladding 220. The core 210 forms a channel of signal light. The cladding 220 is arranged to surround the core 210 and forms a channel of feed light.

The powered device 310 includes a photoelectric conversion element 311. The second data communication device 300 includes, in addition to the powered device 310, a transmitter 320, a receiver 330, and a data processor 340. The second data communication device 300 corresponds to a power end station or the like. The transmitter 320 includes a semiconductor laser 321 for signals and a modulator 322. The receiver 330 includes a photodiode 331 for signals. The data processor 340 is a unit that processes a received signal. The second data communication device 300 is a node in a communication network. Alternatively, the second data communication device 300 may be a node that communicates with another node.

The first data communication device 100 is connected to a power source, which electrically drives the semiconductor laser 111 for power supply, the semiconductor laser 121 for signals, the modulator 122, the photodiode 131 for signals, and so on. The first data communication device 100 is a node in the communication network. Alternatively, the first data communication device 100 may be a node that communicates with another node.

The semiconductor laser 111 for power supply oscillates with electric power supplied from the power source to output feed light 112.

The photoelectric conversion element 311 converts the feed light 112 transmitted through the optical fiber cable 200 into electric power. The electric power obtained by the photoelectric conversion element 311 through the conversion is used as driving electric power for the transmitter 320, the receiver 330, and the data processor 340 and as other driving electric power needed in the second data communication device 300. The second data communication device 300 may be capable of outputting, for an external device, the electric power obtained by the photoelectric conversion element 311 through the conversion.

On the other hand, the modulator 122 of the transmitter 120 modulates laser light 123 output from the semiconductor laser 121 for signals into signal light 125 on the basis of transmission data 124, and outputs the signal light 125.

The photodiode 331 for signals of the receiver 330 demodulates the signal light 125 transmitted through the optical fiber cable 200 into an electric signal, and outputs the electric signal to the data processor 340. The data processor 340 transmits data based on the electric signal to a node. The data processor 340 also receives data from the node, and outputs, as transmission data 324, the data to the modulator 322.

The modulator 322 of the transmitter 320 modulates laser light 323 output from the semiconductor laser 321 for signals into signal light 325 on the basis of the transmission data 324, and outputs the signal light 325.

The photodiode 131 for signals of the receiver 130 demodulates the signal light 325 transmitted through the optical fiber cable 200 into an electric signal, and outputs the electric signal. Data based on the electric signal is transmitted to a node. Data from the node is treated as the transmission data 124.

The feed light 112 and the signal light 125 output from the first data communication device 100 are input to one end 201 of the optical fiber cable 200. The feed light 112 and the signal light 125 propagate through the cladding 220 and the core 210, respectively, and are output from another end 202 of the optical fiber cable 200 to the second data communication device 300.

The signal light 325 output from the second data communication device 300 is input to the other end 202 of the optical fiber cable 200, propagates through the core 210, and is output from the one end 201 of the optical fiber cable 200 to the first data communication device 100.

Figure 3:
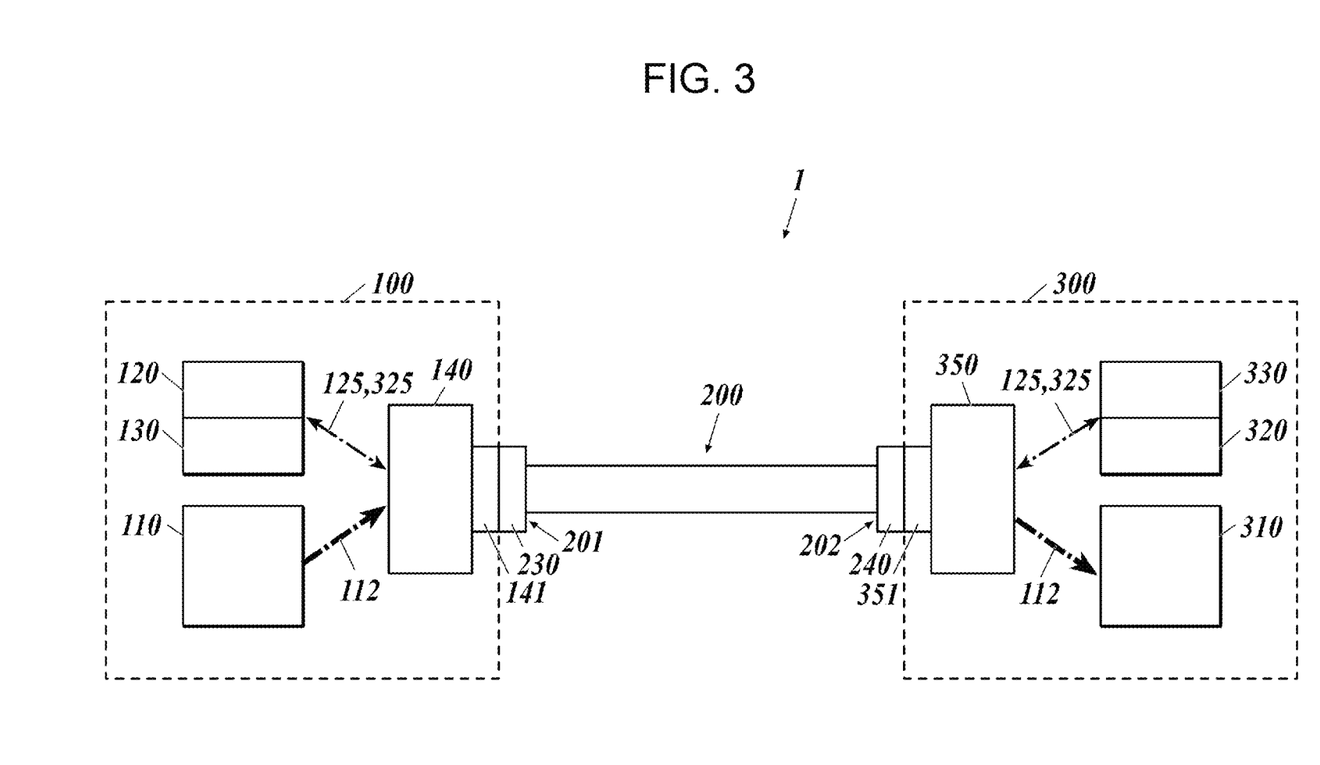
FIG. 3 is a diagram illustrating the configuration of the power-over-fiber system according to the second embodiment of the present disclosure, and illustrates optical connectors, etc.

As illustrated in FIG. 3, the first data communication device 100 includes a light input/output part 140 and an optical connector 141 attached to the light input/output part 140. In addition, the second data communication device 300 includes a light input/output part 350 and an optical connector 351 attached to the light input/output part 350. An optical connector 230 at the one end 201 of the optical fiber cable 200 is connected to the optical connector 141. An optical connector 240 at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300, and transmits the feed light 112. Further, in the present embodiment, the optical fiber cable 200 transmits the signal light 125 and the signal light 325 bidirectionally.

As semiconductor materials of semiconductor regions that exhibit a light-electricity conversion effect of the semiconductor laser 111 for power supply and the photoelectric conversion element 311, same and/or similar materials as those mentioned in the first embodiment may be used, so that a high optical power supply efficiency is implemented.

Figure 4:
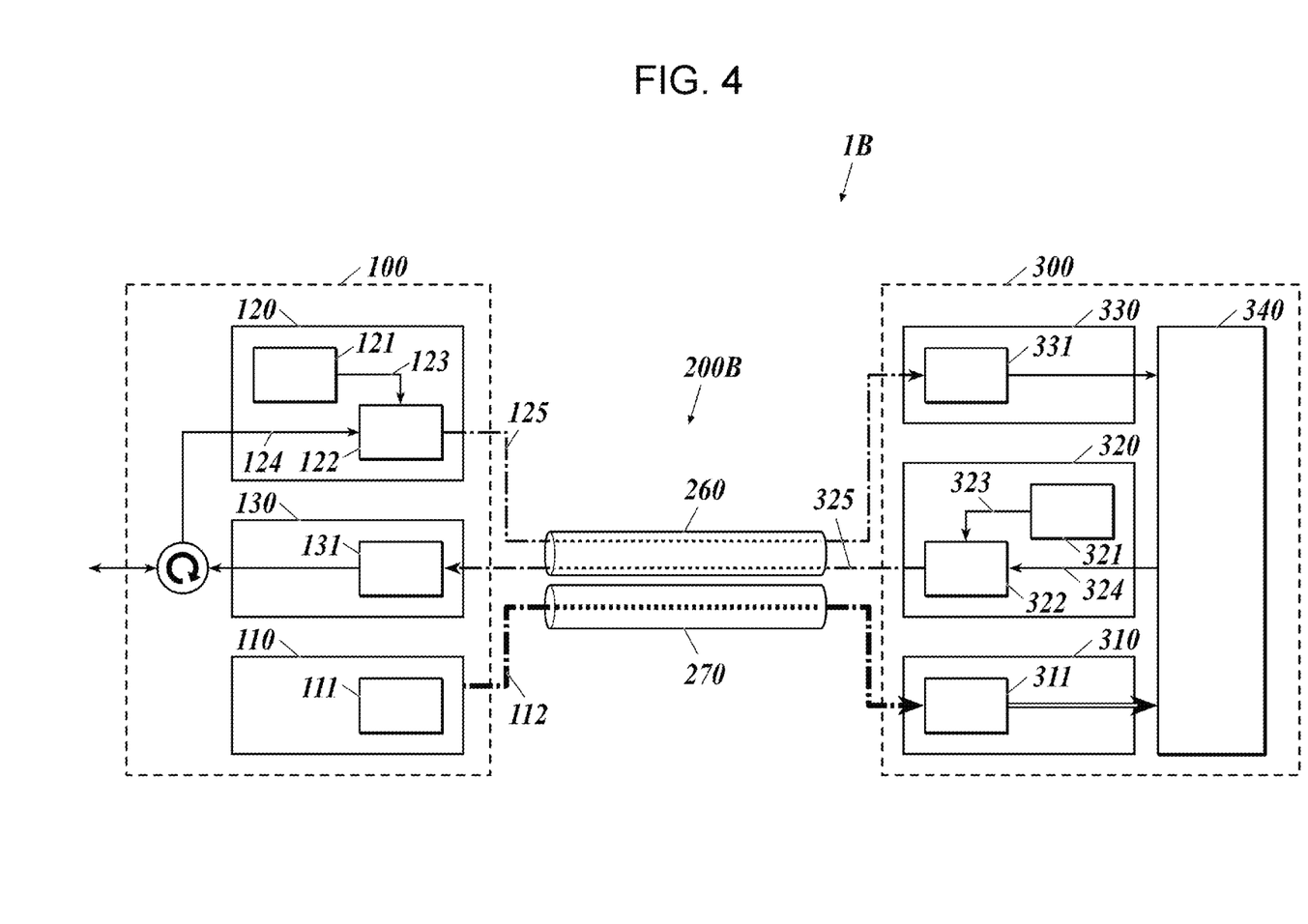
FIG. 4 is a diagram illustrating a configuration of a power-over-fiber system according to another embodiment of the present disclosure.

As in an optical fiber cable 200B of a power-over-fiber system 1B illustrated in FIG. 4, an optical fiber 260 that transmits signal light and an optical fiber 270 that transmits feed light may be provided separately. The optical fiber cable 200B may be constituted by a plurality of optical fiber cables.

(2) Distribution of Feed Light

A power-over-fiber system 1A that distributes feed light from a power sourcing equipment to a plurality of powered devices is described next.

First Example

Figure 5:
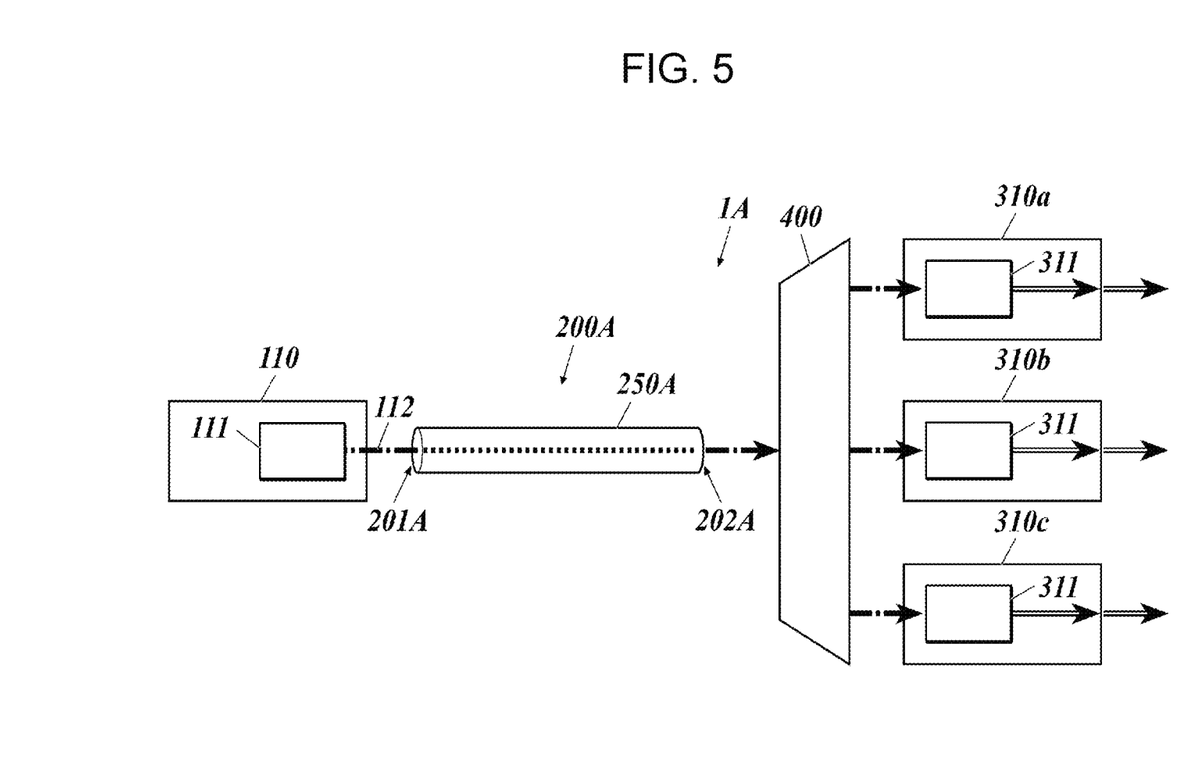
FIG. 5 is a diagram illustrating a configuration of a power-over-fiber system according to a third embodiment of the present disclosure.

The power-over-fiber system 1A illustrated in FIG. 5 includes a power sourcing equipment 110 including a semiconductor laser 111 for power supply, a plurality of (three in the present embodiment) powered devices 310a, 310b, and 310c each including a photoelectric conversion element 311, an optical fiber cable 200A that transmits feed light 112 from the power sourcing equipment 110 to the plurality of powered devices 310a, 310b, and 310c, and a switch element 400 that distributes the feed light 112 from the power sourcing equipment 110 to the plurality of powered devices 310a, 310b, and 310c.

The optical fiber cable 200A includes an optical fiber 250A that forms a channel of feed light.

The switch element 400 is disposed between the optical fiber cable 200A and the plurality of powered devices 310a, 310b, and 310c and distributes the feed light 112 transmitted through the optical fiber 250A to the plurality of powered devices 310a, 310b, and 310c.

The power sourcing equipment 110 is connected to a power source, which electrically drives the semiconductor laser 111 for power supply.

The semiconductor laser 111 for power supply oscillates with electric power supplied from the power source to output the feed light 112.

The optical fiber cable 200A has one end 201A connectable to the power sourcing equipment 110 and another end 202A connectable to the switch element 400 on the powered device side, and transmits the feed light 112.

The feed light 112 from the power sourcing equipment 110 is input to the one end 201A of the optical fiber cable 200A. The feed light 112 propagates through the optical fiber 250A and is output from the other end 202A to the switch element 400 on the powered device side.

Each photoelectric conversion element 311 converts the feed light 112 transmitted through the optical fiber cable 200A and the switch element 400 into electric power. The electric power obtained by each photoelectric conversion element 311 through the conversion is used as driving electric power needed in a respective one of the powered devices 310a, 310b, and 310c. Each of the powered devices 310a, 310b, and 310c is capable of outputting, for an external device, the electric power obtained by the respective one of photoelectric conversion elements 311 through the conversion.

The switch element 400 distributes the feed light 112 from the power sourcing equipment 110 in accordance with a proportion of electric powers needed by the plurality of powered devices 310a, 310b, and 310c.

Specifically, the switch element 400 sequentially switches an optical path of the feed light 112 to be distributed to the powered devices 310a, 310b, and 310c with a time distribution corresponding to the proportion of the electric powers needed by the plurality of powered devices 310a, 310b, and 310c. In this manner, the switch element 400 distributes the feed light 112 to the plurality of powered devices 310a, 310b, and 310c.

For example, when the proportion of the electric powers needed by the powered devices 310a, 310b, and 310c is 2:3:5, the switch element 400 sequentially switches the optical path of the feed light 112 to be distributed to the powered devices 310a, 310b, and 310c with a time distribution of 2:3:5.

That is, while the power sourcing equipment 110 is outputting the feed light 112, the switch element 400 keeps on switching the optical path of the feed light 112 to be distributed to the powered devices 310a, 310b, and 310c with that time distribution. When a unit time is equal to one second, the feed light 112 is transmitted to the powered devices 310a, 310b, and 310c for 0.2 seconds, 0.3 seconds, and for 0.5 seconds, respectively, per unit time.

At that time, the power sourcing equipment 110 outputs the feed light 112 equivalent to the total amount of the electric powers needed by the powered devices 310a, 310b, and 310c. The feed light 112 is distributed by the switch element 400 to the powered devices 310a, 310b, and 310c with the time distribution corresponding to the proportion of the electric powers needed by the powered devices 310a, 310b, and 310c. Thus, the respective photoelectric conversion elements 311 convert the feed light 112 to be distributed to the respective powered devices 310a, 310b, and 310c into electric powers, so that the powered devices 310a, 310b, and 310c can obtain the needed electric powers.

As described above, the power-over-fiber system 1A in which the switch element 400 distributes the feed light 112 output by the power sourcing equipment 110 to the powered devices 310a, 310b, and 310c with the time distribution corresponding to the proportion of the electric powers needed by the powered devices 310a, 310b, and 310c can implement efficient power supply corresponding to electric power loads on the powered side.

The switch element 400 may be an element that distributes the feed light 112 to the powered devices 310a, 310b, and 310c with a previously set time distribution (distribution proportion) or an element that distributes the feed light 112 to the powered devices 310a, 310b, and 310c with a time distribution (distribution proportion) adjusted in accordance with a command from the power sourcing equipment 110.

Second Example

Figure 6:
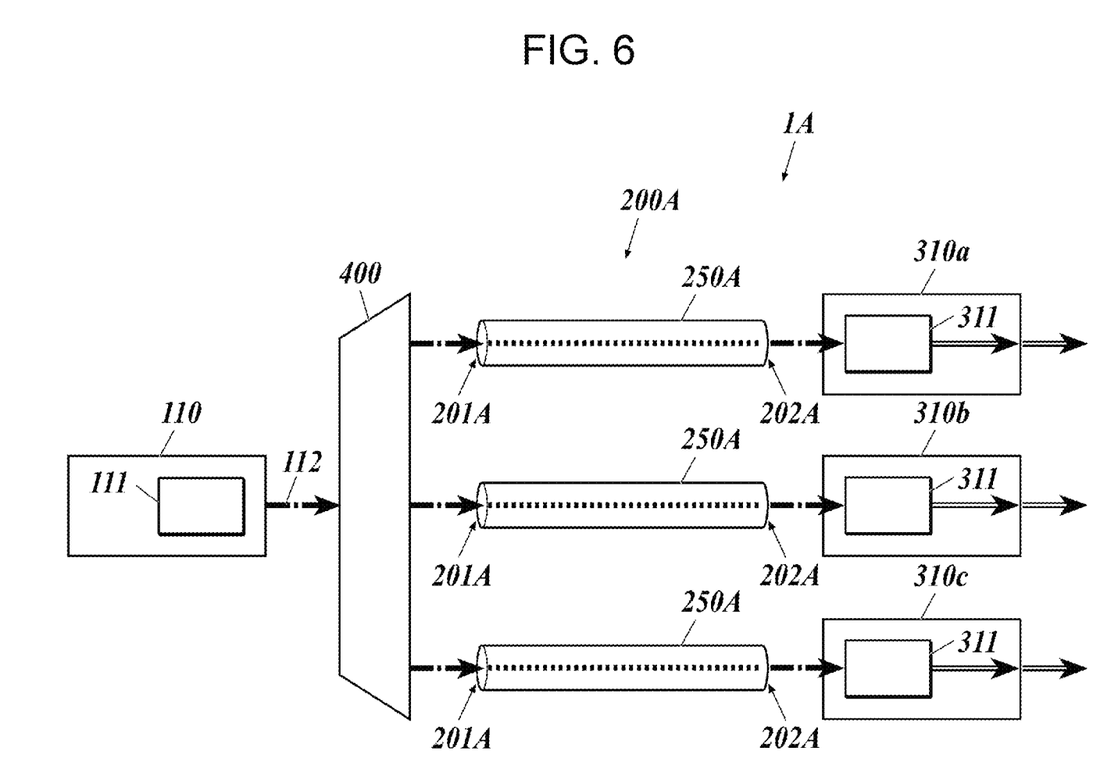
FIG. 6 is a diagram illustrating a configuration of a variation of the power-over-fiber system according to the third embodiment of the present disclosure.

A power-over-fiber system 1A illustrated in FIG. 6 includes a power sourcing equipment 110 including a semiconductor laser 111 for power supply, a plurality of (three in the present embodiment) powered devices 310a, 310b, and 310c each including a photoelectric conversion element 311, an optical fiber cable 200A that transmits feed light 112 from the power sourcing equipment 110 to the plurality of powered devices 310a, 310b, and 310c, and a switch element 400 that distributes the feed light 112 from the power sourcing equipment 110 to the plurality of powered devices 310a, 310b, and 310c.

The optical fiber cable 200A includes a plurality of (three in the present embodiment) optical fibers 250A each of which forms a channel of feed light. Each of the optical fibers 250A is disposed to correspond to a respective one of the plurality of powered devices 310a, 310b, and 310c.

The switch element 400 is disposed between the power sourcing equipment 110 and the optical fiber cable 200A and distributes the feed light 112 from the power sourcing equipment 110 to the plurality of optical fibers 250A to distribute the feed light 112 to the plurality of powered devices 310a, 310b, and 310c.

The power sourcing equipment 110 is connected to a power source, which electrically drives the semiconductor laser 111 for power supply.

The semiconductor laser 111 for power supply oscillates with electric power supplied from the power source to output the feed light 112.

The optical fiber cable 200A has one ends 201A connectable to the switch element 400 disposed on the power sourcing equipment 110 side and other ends 202A connectable to the powered devices 310a, 310b, and 310c, and transmits the feed light 112.

The feed light 112 from the power sourcing equipment 110 is input to the one ends 201A of the optical fiber cable 200A through the switch element 400. The feed light 112 propagates through the optical fibers 250A and is output from the other ends 202A to the respective powered devices 310a, 310b, and 310c.

Each photoelectric conversion element 311 converts the feed light 112 transmitted through the switch element 400 and the optical fiber cable 200A into electric power. The electric power obtained by each photoelectric conversion element 311 through the conversion is used as driving electric power needed in a respective one of the powered devices 310a, 310b, and 310c. Each of the powered devices 310a, 310b, and 310c is capable of outputting, for an external device, the electric power obtained by the respective one of photoelectric conversion elements 311 through the conversion.

The switch element 400 distributes the feed light 112 from the power sourcing equipment 110 in accordance with a proportion of electric powers needed by the plurality of powered devices 310a, 310b, and 310c.

Specifically, the switch element 400 sequentially switches an optical path of the feed light 112 to be distributed to the powered devices 310a, 310b, and 310c with a time distribution corresponding to a proportion of electric powers needed by the plurality of powered devices 310a, 310b, and 310c. In this manner, the switch element 400 distributes the feed light 112 to the plurality of powered devices 310a, 310b, and 310c (the plurality of optical fibers 250A in this case).

Similarly to the power-over-fiber system 1A according to the first example described above, the power-over-fiber system 1A thus configured distributes, with the switch element 400, the feed light 112 output by the power sourcing equipment 110 to the powered devices 310a, 310b, and 310c with the time distribution corresponding to the proportion of the electric powers needed by the powered devices 310a, 310b, and 310c. In this manner, the power-over-fiber system 1A can implement efficient power supply corresponding to electric power loads on the powered side.

FIG. 6 illustrates the switch element 400 adjacently to the power sourcing equipment 110. However, this switch element 400 may be included in the power sourcing equipment 110 and may distribute the feed light 112 from the semiconductor laser 111 for power supply to the plurality of optical fibers 250A.

That is, even the power-over-fiber system 1A configured such that the switch element 400 is incorporated in the power sourcing equipment 110 can implement efficient power supply corresponding to electric power loads on the powered side.

Figure 7:
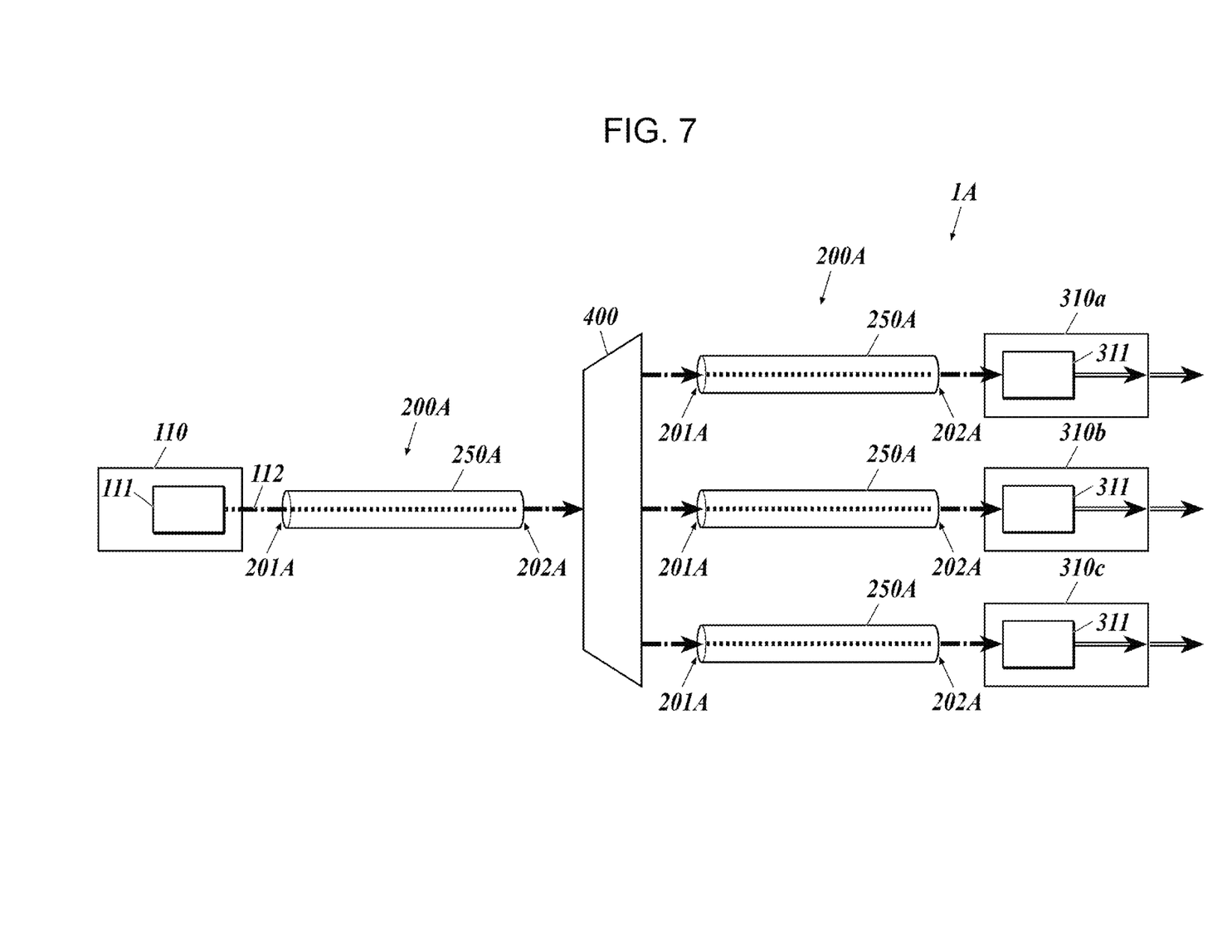
FIG. 7 is a diagram illustrating a configuration of a variation of the power-over-fiber system according to the third embodiment of the present disclosure.

In addition, as illustrated in FIG. 7, the power-over-fiber system 1A in which the optical fiber cables 200A are disposed on the respective sides of the switch element 400, that is, the power-over-fiber system 1A in which the optical fiber cable 200A is disposed between the power sourcing equipment 110 and the switch element 400 and the optical fiber cable 200A is disposed between the switch element 400 and the plurality of powered devices 310a, 310b, and 310c may be used.

As described above, even the power-over-fiber system 1A having a configuration of the combination of the first and second examples described above can implement efficient power supply corresponding to electric power loads on the powered side.

Although the power-over-fiber system 1A including the three powered devices 310a, 310b, and 310c has been described as an example above, the present invention is not limited to this. The present invention is applicable to a power supply system including two or more powered devices 310.

While the embodiments of the present disclosure have been described above, these embodiments are merely presented as examples and can be carried out in various other forms. Each component may be omitted, replaced, or modified within a range not departing from the gist of the invention.

INDUSTRIAL APPLICABILITY

The present invention can be used as a power-over-fiber system as being configured in the above-described manner.

The invention claimed is:

1. A power-over-fiber system, comprising:
   a power sourcing equipment including a semiconductor laser configured to oscillate with electric power to output feed light;
   a plurality of powered devices each including a photoelectric conversion element configured to convert the feed light from the power sourcing equipment into electric power;
   an optical fiber cable configured to transmit the feed light from the power sourcing equipment to the plurality of powered devices; and
   a switch element configured to, in response to receiving a command from the power sourcing equipment, distribute the feed light in accordance with a proportion of electric powers needed by the plurality of powered devices.

2. The power-over-fiber system according to claim 1, wherein
   the switch element is configured to sequentially switch an optical path of the feed light to be distributed to the respective powered devices, with a time distribution corresponding to the proportion.

3. The power-over-fiber system according to claim 1, wherein
   the switch element is disposed between the power sourcing equipment and the optical fiber cable.

4. The power-over-fiber system according to claim 1, wherein
   the switch element is disposed between the optical fiber cable and the plurality of powered devices.

5. The power-over-fiber system according to claim 1, wherein
   a semiconductor material of a semiconductor region that exhibits a light-electricity conversion effect of the semiconductor laser is a laser medium having a laser wavelength of 500 nm or shorter.

6. The power-over-fiber system according to claim 1, wherein
   a semiconductor material of a semiconductor region that exhibits a light-electricity conversion effect of the photoelectric conversion element is a laser medium having a laser wavelength of 500 nm or shorter.

7. The power-over-fiber system according to claim 1, wherein
   the power sourcing equipment is configured to output the feed light equivalent to a total amount of the electric powers needed by the plurality of powered devices.

* * * * *